UNITED STATES PATENT OFFICE.

FRANCIS S. BENENATI, OF SYRACUSE, NEW YORK.

COMPOSITION OF MATTER.

1,331,690.          Specification of Letters Patent.        Patented Feb. 24, 1920.

No Drawing.      Application filed June 8, 1918.   Serial No. 238,858.

*To all whom it may concern:*

Be it known that I, FRANCIS S. BENENATI, a citizen of the United States, and a resident of Syracuse, in the county of Onondaga and State of New York, have invented a certain new and useful Composition of Matter, of which the following is a specification.

This invention has for its object the production of a composition particularly applicable for healing purposes or treating by external application or by injection, certain diseases, particularly skin diseases. My healing composition consists of a mixture of pure gum camphor, oil of juniper berries, true oil of bitter almonds, fluid bay laurel, solution of menthol, 25% grain alcohol (95% proof) pure carbolic acid and a small amount of mercury bichlorid.

In most cases, these ingredients are mixed with a suitable base as pure olive oil but in some instances olive oil can be omitted.

Preferably, the ingredients are mixed in equal amounts as hereinafter specified but good results can be obtained by varying the amounts so that they are not equal. In any case, a substantial amount of each ingredient must be used.

Usually, the composition consists of equal amounts of pure gum camphor, oil of juniper berries, true oil of bitter almonds, fluid bay laurel, solution of menthol, grain alcohol with a small amount of pure carbolic acid, and preferably the mixture consists of by weight, 8% pure gum camphor, 8% of oil of juniper berries, 8% pure oil of bitter almonds, 8% fluid bay laurel, 8% solution of menthol, 8% solvent or grain alcohol, 2% of carbolic acid and mercury bichlorid to the ratio of 1:1000 solution and 50% pure olive oil. The amount of olive oil is variable according to the age and physical strength of the person to whom the composition is to be applied.

The composition is preferably compounded as follows: The camphor is first dissolved in alcohol then the oil of bitter almonds, oil of juniper berries and fluid bay laurel; the carbolic acid, mercury bichlorid and solution of menthol added in order. The whole matter is then allowed to stand from a day to a week in order that chemical action may take place between them, or if no chemical action takes place, in order that each ingredient may act on or modify the other, or others. It is my opinion, that a chemical action takes place.

The gum camphor, oil of juniper berries, true oil of bitter almonds, fluid bay laurel and menthol are germicides and irritants. I am of the opinion they act to some extent together and to some extent counteract each other. The carbolic acid is a disinfectant and the alcohol is a neutralizing agent to the carbolic acid and also acts as a solvent and the menthol neutralizes the powerful effect of the bitter almonds, juniper and laurel. The base is a cooling agent and a protector to tissues.

It is preferable to use fluid bay laurel but ordinary bay or extract of fluid made from any of the bay tree family may be used.

As before stated, my composition is applied by external application and can be used in some instances by injection and in the latter case the percentage of olive oil is increased.

My composition is particularly adapted to heal skin diseases such as psoriasis, eczema, ichthyosis, etc.

The olive oil acts as a counter-irritant and prevents the rapid penetration of the other ingredients of the composition where tissues are destroyed. It also prevents the drying of the small capillaries in diseased tissues, which capillaries help the work of reconstruction of the tissues, after the germs have been destroyed in the diseased tissues or parts. It also is a healing agent, especially in combination with other germicidal ingredients. In short, it prevents rapid penetration and heals and reconstructs the tissues. In some cases, the solution can be used without the olive oil. The pure gum camphor acts as a drying agent, the oil of juniper berries is a germicidal and an irritant. The pure oil of bitter almonds acts as a germicidal agent, and also as a strong stimulant, while the fluid of bay laurel acts as a mild stimulant. The solution of menthol acts as a neutralizing agent of poisonous qualities of other ingredients and also is a cooling agent. The carbolic acid acts as a germicidal agent and also the bichlorid acts in its well-known and peculiar manner as a germicidal agent in certain cases. As before stated, the grain alcohol is a vehicle and solvent.

What I claim is:

1. A liquid healing composition consisting of a mixture of equal parts by weight, of pure gum camphor, oil of juniper berries, true oil of bitter almonds, fluid of bay laurel, solution of menthol and grain alcohol and less amounts of carbolic acid and mercury bichlorid and olive oil, up to and above 50% of the total amount of the preceding ingredients.

2. A liquid healing composition consisting of a mixture of substantially equal parts by weight of pure gum camphor, oil of juniper berries, true oil of bitter almonds, fluid bay laurel, solution of menthol, and grain alcohol and less amounts of carbolic acid and mercury bichlorid.

3. A fluid healing composition consisting of by weight, 8% of pure gum camphor, 8% oil of juniper berries, 8% true oil of bitter almonds, 8% fluid bay laurel, 8% of solution of menthol, 8% of grain alcohol, 2% of carbolic acid, mercury bichlorid to the ratio of 1:1000 solution and true olive oil 50%.

In testimony whereof I have hereunto signed my name at Syracuse, in the county of Onondaga and State of New York, this 6th day of June, 1918.

FRANCIS S. BENENATI.